Figure 1:
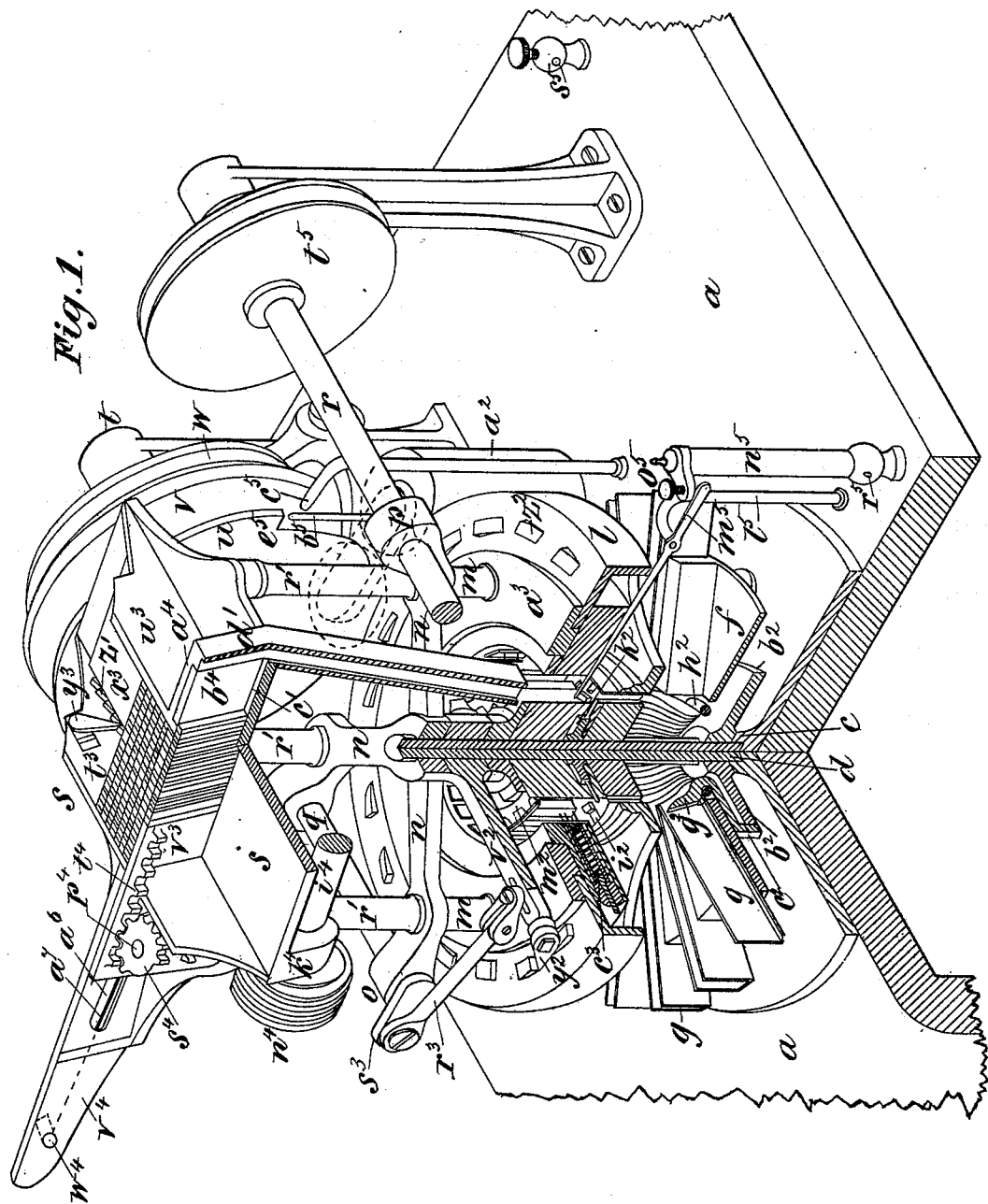

W. D. C. PATTYSON.
TYPE DISTRIBUTING-MACHINE.

No. 175,147.  Patented March 21, 1876.

5 Sheets—Sheet 1.

Witnesses.
C. G. C. Simpson
M. A. Nelson

Inventor
W. D. C. Pattyson

5 Sheets—Sheet 2.

W. D. C. PATTYSON.
TYPE DISTRIBUTING-MACHINE.

No. 175,147. Patented March 21, 1876.

Witnesses
C. G. C. Simpson
M. A. Nelson

Inventor
W. D. C. Pattyson

N. PETERS, PHOTO-LITHOGRAPHER, WASHINGTON, D. C.

W. D. C. PATTYSON.
TYPE DISTRIBUTING-MACHINE.
No. 175,147.
5 Sheets—Sheet 3.
Patented March 21, 1876.
Fig. 3.
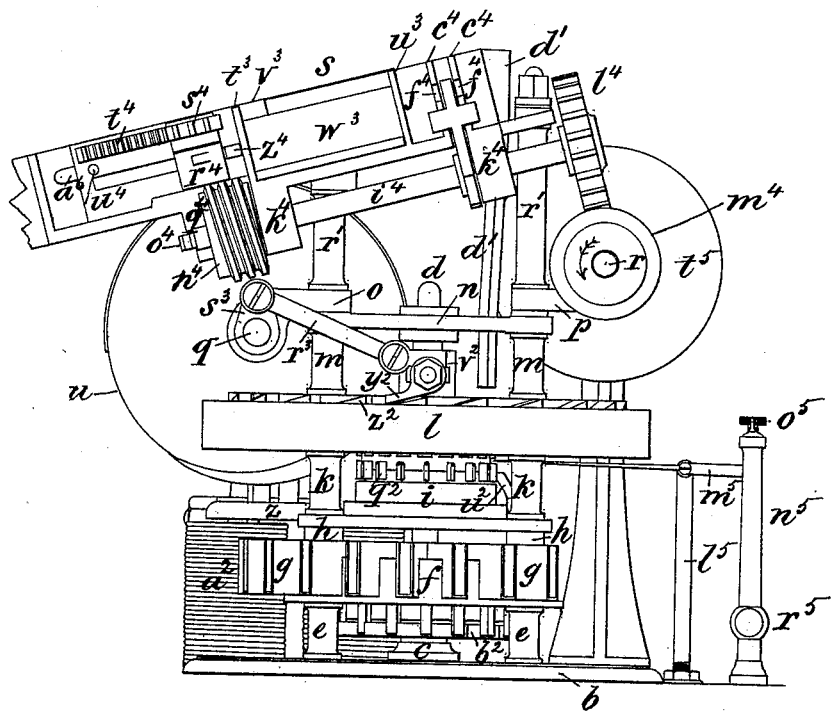
Fig. 4.
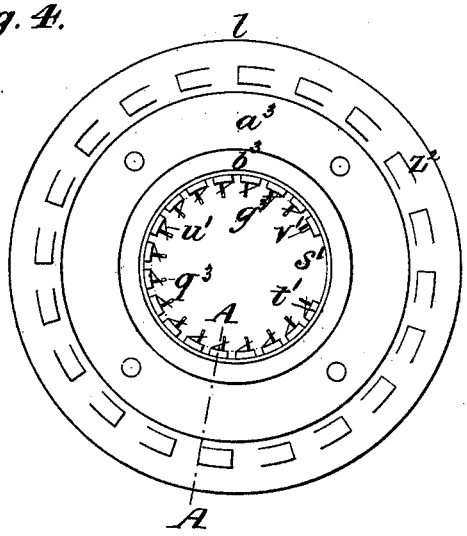
Fig. 6.
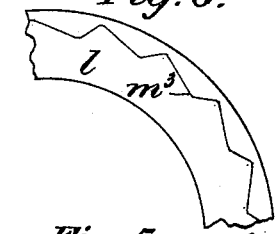
Fig. 5.
Fig. 7.
Witnesses
C. G. C. Simpson
M. A. Nelson
Inventor
W. D. C. Pattyson

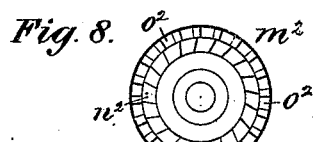
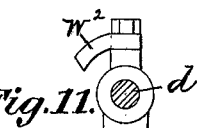
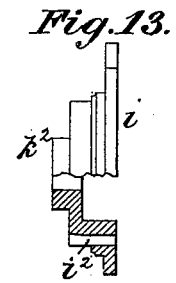
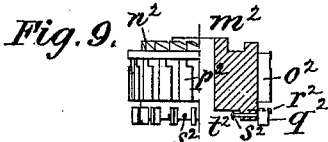
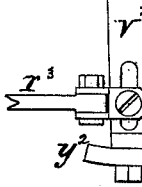
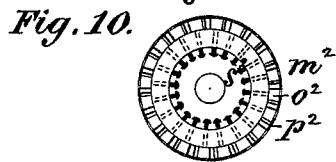
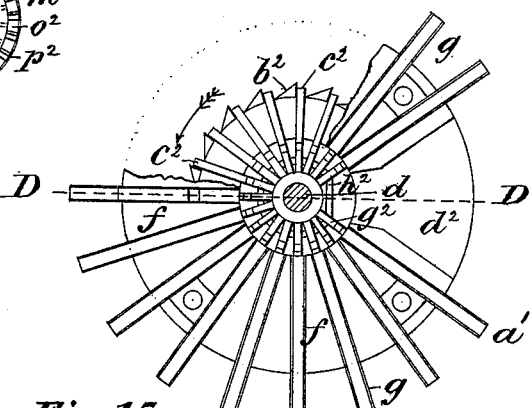
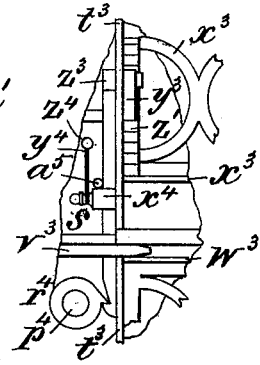
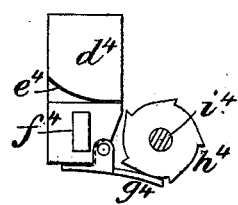
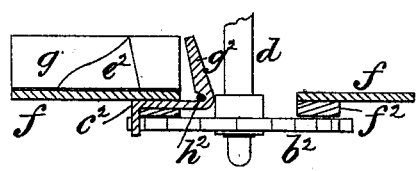
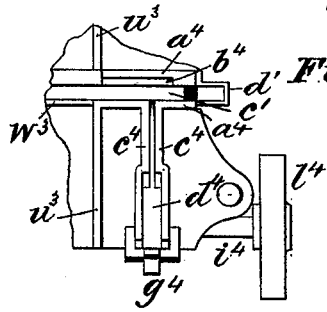

5 Sheets—Sheet 5.

W. D. C. PATTYSON.
TYPE DISTRIBUTING-MACHINE.

No. 175,147. Patented March 21, 1876.

Witnesses
C. G. C. Simpson
M. A. Nelson

Inventor
W. D. C. Pattyson

UNITED STATES PATENT OFFICE.

WILLIAM D. C. PATTYSON, OF SHERBROOKE, ASSIGNOR OF PART OF HIS RIGHT TO WILLIAM ANGUS, OF MONTREAL, THOMAS LOGAN, CHARLES BROOKS, AND GEORGE H. BRADFORD, OF SHERBROOKE, CANADA, GEORGE W. McMULLEN, OF CHICAGO, ILLINOIS, AND GEORGE CASWELL, OF LENOXVILLE, CANADA.

IMPROVEMENT IN TYPE-DISTRIBUTING MACHINES.

Specification forming part of Letters Patent No. 175,147, dated March 21, 1876; application filed October 8, 1875.

*To all whom it may concern:*

Be it known that I, WILLIAM DAVID CREIGHTON PATTYSON, of the town of Sherbrooke, in the district of St. Francis, Province of Quebec, Canada, student of arts, have invented certain new and useful Improvements in Machines for Distributing Type; and I do hereby declare that the following is a full, clear, and exact description of the same.

This invention has reference to an electro-magnetic machine, by which the type used in printing will be separated, and each particular character out of the column deposited in a separate receptacle. Thus, all the capital letters "A" will be deposited in one receptacle, all the small letters "a" in another, the capital letters "B" in another, and so on. Figures, also, will have their proper receptacles. The machine may be arranged to sort out various kinds of type; as, for instance, from the Roman characters the italics and blocks will not only be separated, but also each particular character in each type will be deposited in its proper receptacle.

In the drawings hereunto annexed, similar letters of reference indicate like parts, and—

Figure 2:
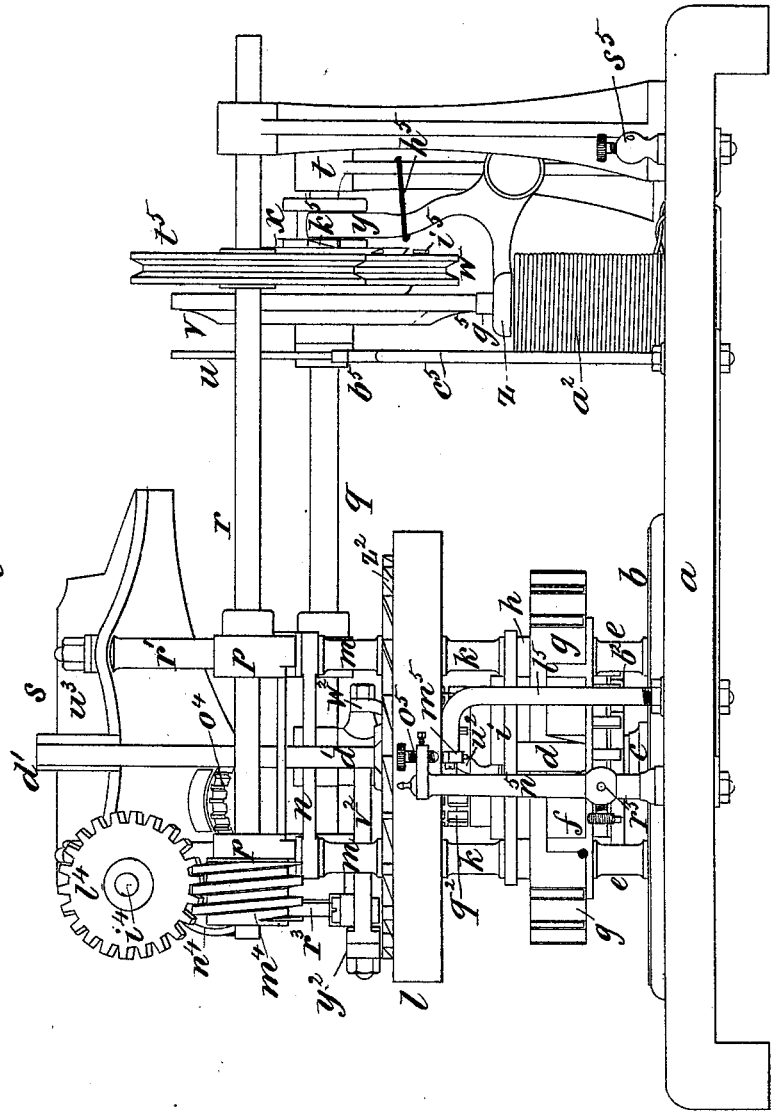
Figure 19:
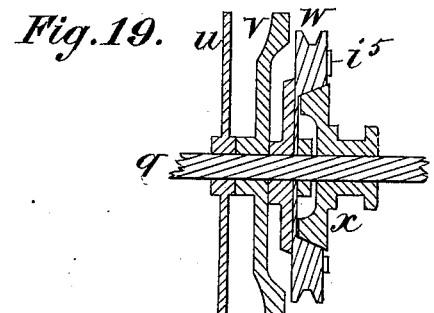
Figure 20:
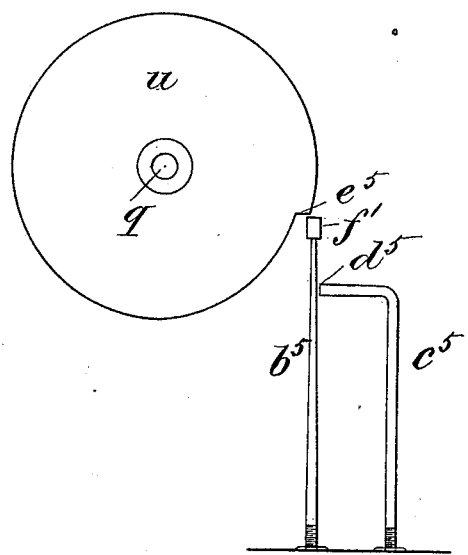
Figure 21:
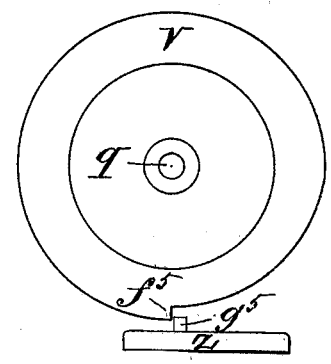

Figure 1 is an isometrical view, showing, partly in section and partly in elevation, the general arrangement of my invention. Fig. 2 is a side elevation of Fig. 1. Fig. 3 is an end elevation of Fig. 1. Fig. 4 is a plan of cam and selector-ring, with selectors in position. Fig. 5 is a section on line A A of Fig. 4. Fig. 6 is a plan of a section of the under side of the cam-ring. Fig. 7 is a section of selector, showing it as applied to type. Fig. 8 is a plan of distributing-barrel. Fig. 9 is a half-side elevation and a half-section of Fig. 8. Fig. 10 is a plan of under side of Fig. 8. Fig. 11 is a plan of double pawl-lever. Fig. 12 is a plan of guide-plate. Fig. 13 is a part elevation of Fig. 12, and part section on line B. Fig. 14 is a part plan of receptacle-plate, showing receptacles for types; also showing type-pusher and ratchet-wheel for working the same. Fig. 15 is the section of Fig. 14 on line D D. Figs. 16 and 17 are details of type-table. Fig. 18 is a detail of separator. Fig. 19 is a sectional detail of cams and friction-gear. Fig. 20 is a detail of disk. Fig. 21 is a detail of stop-disk.

Letter $a$ is any suitable entablature, upon which the mechanism is erected. $b$ is the pedestal of the main portion of the mechanism, which, as shown in the drawings, is made circular in form, and has in its center a step, $c$, to receive the end of a shaft, $d$. $e$ are thimbles or distance-pieces, supporting and maintaining at the proper height above the plate $b$ the receptacle-plate $f$ and receptacles $g$. Projections $h$ are formed upon the plate $f$, supporting the guide-plate $i$. $k$ are thimbles or distance-pieces placed upon $i$, supporting the selector-ring, with the cam-ring $l$ attached to it. $m$ are thimbles supporting the guide $n$, in which the upper end of the shaft $d$ revolves. $o$ and $p$ are brackets, carrying, respectively, the ends of the shafts $q$ and $r$. Upon these the thimbles $r^1$ are placed, carrying the inclined type-table $s$. These parts are all secured together by bolts passing through the thimbles and eyes formed in the various parts, holding them together.

As the machines so far constructed embodying this invention have only been small ones, the above arrangement of attaching the parts in their relative positions alone has been employed. In constructing large machines I should prefer to change the system of connecting the parts together, so that, as far as possible, each part might be attached or detached from the frame-work without disturbing any other, or by disturbing as few as possible.

The extremity of the shaft $q$ is carried by a bracket, $t$, and upon it are placed and secured, in the position shown, cams $u$ and $v$, loose pulley $w$, friction-cone $x$, operated by a pivoted arm, $y$. This arm is provided with a second arm carrying an armature, $z$, placed immediately over a double coil of electro-magnets, $a^2$. As before stated, the foot of the shaft $d$ is received in the step $c$, and immediately above it is secured, upon the shaft $d$, a ratchet-wheel, $b^2$, (see Figs. 14 and 15,) the teeth of the ratchet being spaced all around the wheel, to agree with the equal distances of the extremities of the pusher-bolts $c^2$. The receptacle-plate $f$ is of circular form, and provided with sufficient dead space, $d^2$, the purpose of which will hereinafter more particularly appear. The balance of the space is divided into as many radial grooves as the machine is intended to accommodate different characters, numbers, and varieties of characters of different type, with the exception of the last one $a^1$, which is for what is called the "pi"-box.

In the drawings shown, the machine is arranged for sixteen characters only, and the pi-box. In these grooves, the receptacles $g$, which consist of two sides and a bottom, fit snugly, so that they can be pushed in by hand, but are not in danger of being moved by the action of the bolts $c^2$. $e^2$ are type-rests, one of which is placed in each of the receptacles $g$, to keep the types which fall into them in nearly an upright position. The bolts $c^2$ are attached to the receiver-plate $f$ by means of a ring, $f^2$, placed concentrically with the receptacle-plate $f$, and secured by bolts or screws. In this ring grooves are cut, forming guides for the horizontal part of the bolts $c^2$ to slide freely in, but made sufficiently tight-fitting to maintain the upper extremity $g^2$ in its proper position. One of each of these bolts $c^2$ is provided for each of the receptacles $g$.

It will now be seen that by turning round the wheel $b^2$ in the direction indicated by the arrow, Fig. 14, its teeth, acting on the lower extremities of $c^2$, will cause all the bolts $c^2$ simultaneously to diverge and press into the receptacles $g$, thereby pushing outward any type which has fallen in between them and the rests $e$, which are placed near the inner extremity of the receptacle $g$. The bolts $c^2$ are caused to converge at the passing of each of the teeth of the wheel $b^2$, by means of an elastic band, $h^2$, placed around their necks, as shown in Figs. 1 and 15, or an endless spiral spring may be formed for this purpose. Thus, as each character is received in $g$ and pushed back by $g^2$, the rest $e^2$ recedes, sliding freely, and when the bolt converges a new space is formed for the reception of the next character. The faces of the rest $e^2$ and that of $g^2$ are inclined, for the purpose of giving the type a slight incline outward; for, should they be placed vertically and not stand fairly on their bases, they might topple over and fall inward, thereby obstructing the descent of the next type.

The guide-plate $i$ is constructed as follows: In its center a cylinder is formed, having passages $z^2$ in it to come immediately over the end of each of the receptacles $g$. $k^2$ is a cam, formed on the center of $i$, as shown in Figs. 12 and 13; through the center opening in this the shaft $d^2$ passes. Immediately above this is secured, on the shaft $d$, the distributer-barrel $m^2$, shown more particularly in Figs. 8, 9, and 10, having on its top rack-teeth $n^2$, to correspond in number with grooves $o^2$, formed on its periphery. These grooves are partially covered by plates $p^2$, leaving a sufficient space for the projections of the selectors, which will be hereinafter more particularly described, to enter and "feel" or engage with the type. The distributer-barrel is extended below the grooves, and on this extension small trap-doors or drop-bottoms $q^2$ are attached, being pivoted and swinging freely on pins $r^2$, screwed into the barrel of the distributer. $s^2$ are small pins passing, as shown particularly in Figs. 9 and 10, through the bottom extension of the distributer-barrel, and so situated that when any one of the drop-bottoms is turned to a horizontal position, and the pins $s^2$ pushed out, the drop-bottom is by it secured in that position. This is done by the projection $l^2$ of the cam $k^2$, the top of the cam $k^2$ coming close to the under surface $t^2$ of distributer-bottom. Thus, as the distributer-barrel revolves with the shaft $d$, and the guide-plate $i$ and cam $k^2$ are stationary, each of the pins $s^2$ are alternately pressed outward as they pass the projection $l^2$, the drop-bottoms being successively raised, as the distributer-barrel $m^2$ revolves, by the projection $u^2$, which is immediately over the dead-space $d^2$ on the receptacle-plate $f$. It will be observed that there are twenty grooves $o^2$ in the barrel $m^2$. This is to cause the grooves in it to correspond with the inner ends of the receptacles $g$, no matter in what position the barrel may be turned to bring the grooves $o^2$ to agree with them. For this purpose three extra grooves are formed to occupy the space formed by the dead-space $d^2$; the position of the projection $l^2$ of the cam $k^2$ and the lifter $u^2$ being so arranged that the pins $s^2$ will be pushed out after the drop-bottom is raised to the horizontal position, and before it is fully clear of the projection $u^2$. On the shaft $d$, immediately above the distributer-barrel, the pawl-lever $v^2$ is placed, the shaft $d$ forming a pivot for it to rotate freely upon, having on one extremity the pawl $w^2$, to engage with rack-teeth $n^2$ on the barrel $m^2$, and pawl $y^2$ to engage with the rack-teeth $z^2$ on cam-ring $l$. $a^3$ is the selector-ring, which is stationary, being securely held in place by the bolts passing through the thimbles hereinbefore mentioned. This is made in two parts, $a^3$ and $b^3$, as shown in Fig. 5, to form a guide for the cam-ring $l$. In the selector-ring $b^3$ selectors $c^3$ are placed, suitable in number to agree with the receptacles $g$, and one over, the first one being for straightening the types in the grooves $o^2$, and in position to agree with the grooves $o^2$ of the distributer-barrel $m^2$, a space being left in the circle in which they stand, agreeing with the dead-space $d^2$. The particular construction of the selectors is more clearly shown in Figs. 5 and 7. A hole, $d^3$, is bored in the selector-ring $b^3$ for the reception of each selector. This hole is of suitable diameter to receive the end $e^3$ of the selector, and extends a distance in of equal diameter, as shown in Fig. 5, when the diameter is reduced to agree with the body $f^3$. By this means it is fairly guided and held in position. To the body $f^3$ is screwed a head, $g^3$, and in it is inserted a pin, $h^3$, working in a groove formed on the under side of selector-ring $b^3$, and preventing the whole from changing its position.

In the space $d^3$ a spiral spring, $i^3$, is placed, pressing against the shoulder formed by the enlarged end $e^3$ at one end, and the shoulder formed by the decreased diameter of the hole in $b^3$ at the other. By this means the heads $g^3$ are drawn up closely to the inner surface of the ring $b^3$. The bodies $f^3$ are hollow cylinders, and in the space existing between the end of the head $g^3$ (screwed into them, and a bolt $k^3$ placed in them) a spiral spring, $l^3$, is placed, the bore of the body being reduced in the outer extremity, and the bolt $k^3$ being provided with a head to fit the bores, as clearly shown in Fig. 7. Thus, by pressing on the outer end of the bolt $k^3$ the spiral spring $l^3$ is compressed, and pushes out the head $g^3$, causing the spiral spring $i^3$ to be compressed. The pressing in of the bolt $k^3$ is caused by the projections $m^3$ of the cam-ring $l$ as it revolves by the action of the pawl $y$ upon the lever $v^2$. The heads $g^3$ are provided with projections $n^3$, which engage with similar nicks or notches $o^3$ formed in the type $p^3$, which are at this time in grooves $o^2$, shown in Figs. 8, 9, and 10. If the nicks $o^3$ do not correspond with the projections $n^3$, the selectors $c^3$ will be prevented from passing inward to their full extent. $q^3$ is a pin screwed into the bottom part of the head $g^3$ and arranged exactly to agree with the pins $s^2$. By reason of the projections $n^3$ not agreeing with the nicks $o^3$, the pins $q^3$ are prevented from engaging with the pins $s^2$, the spiral spring $l^3$ yielding to let the projection $m^3$ pass the end of the bolt $k^3$, consequently the drop-bottoms are not allowed to fall, and the types are retained in the grooves $o^2$. Had the projections $n^3$ agreed with the nicks $o^3$ the projections would have passed inward until they reached the inner side of the grooves $o^2$, and the pin $q^3$ would have driven in the corresponding pin $s^2$, allowing the drop-bottom $q^2$ to fall, and, by being relieved by the passage of the projections $n^3$, the spring $i^3$, carrying the selector back, would allow the type to fall into the corresponding passage $i^2$ in the guide-plate $i$ beneath it.

By arranging the nicks $o^3$ and projections $n^3$, and varying them according to the types, characters, and figures, the types contained in grooves $o^2$ will be carried round in the grooves of the distributing-barrel till they come to the selector having projections to agree with their nicks.

Although but two projections $n^3$ are shown on the heads $g^3$, their numbers may be increased or diminished, as well as their positions varied, it being necessary to have such a variation of nicks and projections that a different combination will be provided for each type, character in that type, and figure. The pawl-lever $v^2$ is actuated by a connecting-rod, $r^3$, attached to a double eye upon the lever and the pin of a crank, $s^3$, upon the shaft $q$. By this arrangement the cam-ring $l$ and barrel $m^2$ are alternately rotated in opposite direction.

The type-table $s$ is constructed as follows: Upon it flanges $t^3$ $u^3$ are raised perpendicular to the plane of the table. These are for the reception of the type, in column, requiring to be distributed. The galleys containing them are brought to the table and the column removed and placed upon the table, so that the first line of type comes fair with the line of the pusher $v^3$; the front of the column being supported by an angle-plate $w^3$, which, in the case of unleaded type, is secured stationary by set-screws or similar devices, but which, in the case of leaded type, is only held sufficiently in place to support the leads as they are pressed forward from the column, but is free to move when forced to do so by the action of the back angle-plate $x^3$, as will be hereinafter more clearly understood. This back angle-plate is actuated by a pawl, $y^3$, attached on a slide-bar, $z^3$.

In the flange $u^3$ an opening is formed and the flange extended, as shown at $a^4$, Fig. 17, forming a channel, $c^1$, at the end of which a spout or conductor, $d^1$, is attached. The lower extremity of this is situated to come immediately over the grooves $o^2$ of the distributer-barrel $m^2$. In this extension of the flange an elastic cushion, $b^4$, is placed, as shown clearly in Figs. 1 and 17, opposite which extensions of the flange, $c^4$, are formed, carrying and supporting the separator $d^4$. This consists, as shown in the drawing, of a plate of two thicknesses, forming shoulders upon it, having springs $e^4$ attached on each shoulder. It is also provided with projections $f^4$ for further guiding it. It is actuated by the lever $g^4$, operated by a cam, $h^4$, on a shaft, $i^4$, carried by brackets, $k^4$, attached or made in one with the table $s$. This shaft is rotated by a worm-gear, $l^4$, and worm-wheel, $m^4$, upon the shaft $r$. The angle-plate $x^3$ and flusher $v^3$ are both operated by a worm-wheel, $n^4$, working in the teeth of a worm-gear, $o^4$. This worm-gear is secured on the lower end of a spindle, $p^4$, passing through a sleeve, $q^4$, in the table $s$; above which is secured on the spindle a collar, $r^4$, having a cam-projection engaging with a hook on the end of the bar $z^3$, as shown in Fig. 16. Again, above the collar $r^4$, upon the spindle $p^4$, is secured a gear-wheel, $s^4$, the teeth of which only extend two thirds around the circle, and engage with the rack-teeth $t^4$ on the pusher-bar $v^3$. The above gears being so arranged that the shaft $i^4$ makes one revolution for each of the rack-teeth $t^4$ on the pusher-bar $v^3$, and, as the cam $h^4$ is provided with five projections, the separator operates five times to each revolution of the shaft $i^4$. $u^4$ is a projection on the pusher-bar, extending through a slot, $a^6$, in the arm $v^4$, and is connected by a spring, $a^7$, to a stop, $w^4$, on the arm. This spring acts to incline the pusher to return as soon as the teeth of the wheel $s^4$ are clear of the rack-teeth $t^4$. The inclination of the table $s$ is for the purpose of causing the line of type, as it is placed in front of the pusher-bar $v^3$, to rest fairly against it, or "on their feet," and to obviate any danger of their toppling over when approaching the conductor $d^1$ and obstructing the advance of the line of type. The bar $z^3$ is provided with a projection, $x^4$, to which an elastic or spiral spring, $y^4$, is attached, connecting it with a projection, $z^4$, on the table $s$, and drawing it back to a stop, $a^5$. $b^5$ and $c^5$ are two poles connected with an electrical battery, insulated from each other; and $b^5$, being provided with an insulator-head, $f^1$, which acts upon the periphery of the cam $u$, causes the poles to touch at $d^5$ and the contact to be maintained during about three-quarters of the revolution of the disk, the rod $b^5$ being made sufficiently flexible or elastic to recover its upright position after the step $e^5$ has passed the head $f^1$, thus separating the poles $b^5$ and $c^5$. The position of the notch $e^5$ being, as shown in Fig. 20, close to the end of the pole $b^5$, the cam $v$ will be secured on the shaft in such a position that the notch on it, $f^5$, will be about ten degrees behind, in the circle of the disk's periphery, of coming in contact with the stop $g^5$ of the armature $z$. $h^5$ is an elastic band or other spring for drawing back the arm $y$ operating the friction-clutch $x$. On the back of the loose pulley $w$ projections $i^5$ are formed to engage with an arm, $k^5$, on the friction-clutch $x$, to assist the friction-surface in revolving the shaft $q$. The friction-cone $x$ is attached to the shaft $q$ by a key or feather in the ordinary way, for allowing it to slip freely backward and forward, longitudinally, on the shaft, while it obliges the shaft to revolve with the cone. Thus it will be seen that when the magnets $a^2$ attract the armature $z$ with sufficient force to overcome the spring $h^5$ the arm $y$ thrusts the friction-cone $x$ forcibly into the loose pulley $w$, and the shaft $q$ is caused to revolve.

$l^5$ is a standard carrying a pivoted lever, $m^5$, made of superabundant weight toward its outer extremity, and causing its point, which enters between the grooves $o^2$ and drop-bottoms $q^2$ of the distributer-barrel $m^2$, to be elevated and press slightly against the bottom of the grooves $o^2$. The inner extremity of the lever is so situated that it comes fairly under the grooves $o^2$ at each pause of the revolution of the barrel $m^2$. $n^5$ is a standard carrying a screw, $o^5$, adjusted so that when the inner point of the lever $m^5$ is depressed and caused to rest on one of the drop-bottoms $q^2$, the outer extremity of the lever touches the end of the screw $o^5$. The screw $o^5$ and the lever $m^5$ are poles of the same battery (of which $b^5$ and $c^5$ are poles) for the purpose of completing the circuit by connecting the levers $m^5$ with $o^5$, when the circuit is broken by the separation of the pole $b^5$ from pole $c^5$. In constructing the lever $m^5$ the superabundant weight of its outer extremity is only such as to cause it to fall down readily from the screw $o^5$, but when a type in one of the grooves $o^5$ rests upon the inner end of the lever its weight brings the outer end in contact with screw $o^5$. The wires of the battery will be arranged in any ordinary manner, which will be readily understood by any electrician of ordinary skill. One of the wires of the battery is connected at $r^5$, and a connection is made from it to $c^5$. The other battery-wire is connected at $s^5$, thence running through the magnets $a^2$, and passing from them to the pole $b^5$, and thence to the standard $l^5$ and lever $m^5$. $t^5$ is a pulley on the shaft $r$, connecting by any suitable belt with the pulley $w$.

The operation of my invention is as follows: The form, after use in the printing-press, is placed upon the inclined table $s$. The shaft $r$ is rotated (by any suitable power) in the direction indicated by the arrow in Fig. 3, rotating the worm-wheel $m^4$ attached on its extremity, engaging with the worm-gear $l^4$, and rotating the shaft $i^4$ in the proportion of twenty-two revolutions of the shaft $r$ to one of the shaft $i^4$. Consequently the worm-gear $n^4$, revolving with the shaft $i^4$, drives, by means of the gear $o^4$, the spindle $p^4$, revolving the collar $r^4$ and wheel $s^4$, the teeth of the latter engaging with the rack-teeth $t^4$ of the pusher $v^3$, causing it to drive the line of type, then in position, toward the tube $d^1$, down which each type falls separately, and is received in one of the grooves $o^2$ of the distributer-barrel $m^2$. Before, however, the type can reach the tube $d^1$ it has to pass the separator $d^4$, constantly working by the cam $h^4$ and lever $g^4$, its inner end pressing on the type, each is forcibly pressed into the elastic cushion $b^4$, thereby separating it from the character next following, in case they should be stuck together by printing-ink.

It will be observed that the separator $d^4$ acts a great many times to a very small motion of the pusher-bar $v$, so that each type in passing will thereby be forced several times on the cushion $b^4$, insuring its separation. By this arrangement the types are insured to drop separately or singly down the tube $d^1$ as they come to it, which, falling into one of the grooves $o^2$, strikes the inner end of the lever $m^5$, causing the opposite end of it to come in contact with screw $o^5$, connection with which and the lever $m^5$ completes an electrical circuit, bringing into action the power of the electro-magnets $a^2$, causing the arm $y$ to bring the friction-cone $x$ into operation, and rotate the shaft $q$ and crank $s^3$, which latter, in its forward motion, by means of the arm $v^2$ and pawl $w^2$, causes the barrel $m^2$ to advance the distance of one groove in its circular movement, bringing an empty groove immediately under the tube $d^1$, to receive the next type as it drops. The lever $m^5$, thus relieved of the weight of the type, ceases to be in contact with the screw $o^5$.

The electrical circuit is, however, still complete by means of the electrical pole $b^5$ being pressed, by the cam-disk $u$, against the pole $c^5$, until the notch $e^5$ on $u$ releases the spring-pole $b^5$ from contact with the pole $c^5$. The electrical circuit being then entirely destroyed, the armature $z$ is released from the electro-magnets by the spring $h^5$, the arm $y$ disengages the clutch, the stop $g^5$ on the armature rising simultaneously and engaging with the notch $f^5$ of the disk $v$, thus preventing any further revolution of the shaft $q$ until another type drops upon the lever $m^5$. The notch $e^5$ is so placed on the cam-disk $u$ that the electrical circuit is severed on the instant the crank $s^3$ has completed its entire revolution. The return half of the revolution of the crank $s^3$, by means of the lever $v^2$ and pawl $y^3$, causes the cam-wheel $l$ to travel the space of one cam, which movement presses simultaneously into action all the selectors $c^3$, one of which is required for each character in the class of type to be distributed. A dead-space, $s^1$, equal to that required for three selectors is appropriated to the operation of the lifter $u^2$, the cam $l^2$, and to the working of the lever $m^5$. The last selector $t^1$, being a detecting opener, which opens any box which (containing a type) might have escaped the action of its proper selector, in which case it would be received by the receptacle $a^1$ appropriated to pi, which selector differs from all the others in that it has no projections $n^3$ for engaging with the type.

The action of the selectors is as follows: The type used with this machine differs from that ordinarily in use in this essential point only: Each character in the font has its own peculiar arrangement of nicks in lieu of those at present placed on the side of the type for the convenience of the compositor. The dead-space $s^1$ above referred to agrees with the dead-space $d^2$ in the receptacle-plate $f$. The required number of selectors, each provided with projections $n^3$ to correspond with the nicks on the single type allotted to that particular selector, are uniformly arranged around the stationary ring $b^3$, concentric with the barrel $m^2$, in such a manner that the vertical line of nicks $o^3$ in the type contained in the grooves $o^2$ is, in each case, directly opposite to the vertical line of projections $n^3$ on the selector-heads $g^3$, so that when the cam-wheel $l$ presses against the bolts $k^3$ the springs $i^3$ are compressed, and the projections $n^3$ enter the corresponding nicks $o^3$ in the type, which allows the pin $q^3$ to push back the sliding pin $s^2$, so permitting the drop-bottoms $q^2$ to fall. Projections $m^3$ of the cam-wheel $l$ then passing the bolts $k^3$, the projections $n^3$ retire with the selector by the action of the spring $i^3$, thus leaving the type unsupported, allowing it to pass through its groove $i^2$ in the guide-plate $i$, and rest in its receptacle-tube $g$, which is placed directly under the guide to receive it, when it is acted upon by $g^2$ in the manner hereinbefore described.

When any of the receptacle tubes $g$ become full of type, they are removed and empty ones put in their place. It will be observed that a small spring, $u^1$, is attached to the heads $g^3$ of the selectors, with the exception of the first one $v^1$, in Fig. 4, which selector is for the particular purpose of straightening up the type in the groove $o^2$ before it is acted upon by the other selectors. These springs $u^1$ are for the purpose of preventing the type from being displaced by the friction of the projections $n^3$ when they withdraw from the notches $o^3$. After each groove $o^2$ has passed the detecting opener $t^1$, its drop-bottom $q^2$ is raised by means of the stationary projection $u^3$ to its proper level, which being attained, the projection $l^2$ forces the sliding pin $s^2$, as it passes, underneath the drop-bottom, to support it in that position to receive the type from the tube $d^1$. After a line of type has been removed by the pusher $v^3$ from the front of the column, the wheel $s^4$ has revolved till the blank space in its periphery has come opposite to the pusher, thus allowing the pusher to fly back by the action of the spring attached to $u^4$ and $w^4$, at the same time the cam-projection on the collar $r^4$ engages with the hooked end of the slide-bar $z^3$, drawing it forward, and by the action of the pawl $y^3$ on the rack-teeth $z^1$, (see Figs. 1 and 16) draws forward the angle-plate $x^3$ the length of one rack-tooth $z^1$, which rack-teeth $z^1$ are made equal in length to the space of one line of type, or one line of type and the leading, should they be leaded, and thus bringing forward the next line of type in the column to be acted upon by the pusher $v^3$. After the cam-projection on the collar $r^4$ has revolved a sufficient distance to clear the hook, in doing which it brings up the next line of type in front of the pusher $v^3$, it is brought back by the action of the spring $y^4$ till the projection $x^4$ comes in contact with the projection $a^5$.

Having thus described the construction and operation of my invention, what I claim is as follows:

1. The combination of the table $s$ with angle-plates $x^3$ and $w^3$, pawl $y^3$, slide-bar $z^3$, and cam-projection of the collar $r^4$, substantially as and for the purposes described.

2. The combination of the sectorally-toothed wheel $s^4$ with the rack-teeth $t^4$ of pusher $v^3$ and spring $a^7$, substantially as and for the purposes described.

3. The combination of the worm-wheel $n^4$, worm-gear $o^4$, cam-projection of collar $r^4$, wheel $s^4$, for operating the slide-bar $z^4$ and pusher $v^3$, substantially as and for the purposes set forth.

4. The combination of the cushion $b^4$, separator $d^4$, lever $g^4$, and cam $h^4$, substantially as and for the purposes set forth.

5. In the distributer-barrel $m^2$, the combination of the drop-bottoms $q^2$ with pins $s^2$, substantially as and for the purposes described.

6. The combination of the distributer-barrel, provided with the grooves $o^2$, drop-bottoms $q^2$, and pins $s^2$, substantially as and for the purposes set forth.

7. The combination of distributer-barrel $m^2$, pawl $w^2$, lever $v^2$, connecting-rod $r^3$, and crank $s^3$, substantially as and for the purposes described.

8. The combination of the drop-bottoms $q^2$, pins $s^2$, and cam $k^2$, substantially as and for the purposes described.

9. The combination of the distributer-barrel, provided with the grooves $o^2$, drop-bottoms $q^2$, and projection $u^2$, substantially as and for the purposes set forth.

10. The combination, substantially as specified, of the rotating distributer-barrel, having grooves for the reception of types, and the gravitating lever for making and breaking the circuit.

11. The combination of the drop-bottoms $q^2$, pins $s^2$, and pins $q^3$ of the selector $c^3$, substantially as and for the purposes set forth.

12. In the selectors $c^3$, the combination of the projections $n^3$, head $g^3$, and pins $q^3$, substantially as and for the purposes set forth.

13. In the selector $c^3$, the combination of the bolt $k^3$, spring $l^3$, and spring $i^3$, substantially as and for the purposes described.

14. The combination of the projections $m^3$ with bolt $k^3$ of the selector $c^3$, substantially as described.

15. The combination of the selector-rings $a^3$ and $b^3$, selectors $c^3$, and cam-ring $l$, substantially as and for the purposes set forth.

16. The combination of the cam-ring $l$, lever $v^2$, pawl $y^2$, connecting-rod $r^3$, and crank $s^3$, substantially as and for the purposes set forth.

17. The combination of the projections $n^3$ of the selectors $c^3$ with the spring $u^4$, substantially as and for the purposes set forth.

18. The combination of the receptacles $g$, bolts $c^2$, and rest $e^2$, substantially as described.

19. The combination of the receptacles $g$, bolts $c^2$, and wheel $b^2$, substantially as and for the purposes set forth.

20. The combination of the electro-magnetic poles $o^5$ $m^5$ $b^5$ $c^5$ and magnets $a^2$, constructed and arranged for operating substantially as and for the purposes described.

21. The combination of the lever $m^5$, magnets $a^2$, armature $z$, and pivoted arm $y$, with friction-cone $x$, substantially as and for the purposes set forth.

22. The combination of the loose pulley $w$, friction-cone $x$, and disks $v$ and $u$, substantially as and for the purposes set forth.

23. The combination of the disk $u$ with poles $b^5$ and $c^5$, substantially as and for the purposes described.

24. The combination of the disk $v$, stop $g^5$, and armature $z$, substantially as and for the purposes set forth.

25. The combination of the magnets $a^2$, armature $z$, pivoted arm $y$, and spring $h^5$, substantially as and for the purposes set forth.

26. The combination of the pulley $t^5$, pulley $w$, cone $x$, arm $y$, armature $z$, and magnets $a^2$, substantially as and for the purposes described.

W. D. C. PATTYSON.

Witnesses:
C. G. C. SIMPSON,
M. A. NELSON.